United States Patent [19]

Ficken

[11] Patent Number: 4,804,108
[45] Date of Patent: Feb. 14, 1989

[54] IRIS MECHANISM

[75] Inventor: Leonard A. Ficken, St. Louis County, Mo.

[73] Assignee: Unidynamics Corporation, New York, N.Y.

[21] Appl. No.: 57,919

[22] Filed: Jun. 3, 1987

[51] Int. Cl.⁴ .............................................. B65G 59/06
[52] U.S. Cl. ..................................... 221/223; 221/241; 221/251; 221/297; 221/304
[58] Field of Search ............ 221/12, 96, 241, 221-223, 221/239, 294, 304, 193, 297-301, 247-249, 251

[56] References Cited

U.S. PATENT DOCUMENTS

| | | | |
|---|---|---|---|
| 2,489,096 | 11/1949 | Lime | 221/223 |
| 2,852,899 | 9/1958 | Murrell | 221/251 X |
| 2,893,598 | 7/1959 | Reynolds et al. | 221/248 |
| 3,927,799 | 12/1975 | Tindley | 221/223 |
| 4,426,017 | 1/1984 | Ficken et al. | 221/222 |

Primary Examiner—Charles A. Marmor
Attorney, Agent, or Firm—Senniger, Powers, Leavitt and Roedel

[57] ABSTRACT

An iris mechanism for preventing unauthorized removal of containers from apparatus for dispensing containers, such as cups. The apparatus separates and releases a single container from a stack of containers. The iris mechanism defines a central opening through which a released container must pass. The size of the opening may be changed between a closed position wherein the opening is smaller than the largest diameter of a cup to be dispensed by the apparatus and an open position wherein the opening is at least as large as the largest diameter of a cup to be dispensed.

20 Claims, 7 Drawing Sheets

IRIS MECHANISM

BACKGROUND OF THE INVENTION

The invention relates generally to mechanisms for preventing removal of cups from liquid-dispensing machines, such as soda-dispensing machines, and more particularly to an iris mechanism for preventing unauthorized removal of cups from apparatus for dispensing a single cup from a stack of cups within the machine.

Apparatus of the type adapted for dispensing a single container, such as a paper cup, from a stack of containers is used in hot and cold drink vendors, for example, to dispense cups to be filled with liquid. Such vending machines are preferably placed in any convenient location for travelers, students, truck drivers, etc., even though many of these locations are not continuously supervised. It is not uncommon, however, for vandals to attempt to remove cups from such machines, either for use or to scatter them around. This problem is especially acute and expensive when vandals remove every cup in the vendor, leaving no cups for legitimate use, or jam the cup dispenser so that cups cannot be dispensed without the machine being serviced.

SUMMARY OF THE INVENTION

Among the several objects of this invention may be noted the provision of an iris mechanism for preventing unauthorized removal of containers from apparatus for dispensing containers, such as cups; the provision of such an iris mechanism which is adjustable according to the size container to be dispensed; the provision of such an iris mechanism which is adapted to cooperate with dispensing apparatus, that is, an iris mechanism which is automatically operated simultaneously or synchroneously with the dispensing apparatus; the provision of such an iris mechanism which is reliable and durable; and the provision of such an iris mechanism which is economical to manufacture.

Generally, an iris mechanism of the present invention is adapted for preventing unauthorized removal of containers from apparatus for dispensing containers, such as cups. The apparatus includes means for separating and releasing a single container from a stack of containers. The iris mechanism defines a central opening through which a released container must pass and has means for changing the size of the opening between a closed position wherein the opening is smaller than the largest diameter of a cup to be dispensed by the apparatus, and an open position wherein the opening is at least as large as the largest diameter of a cup to be dispensed.

A second aspect of this invention is a combination of an iris mechanism with apparatus for dispensing containers, such as cups, from a stack of nested containers. The apparatus comprises means for dispensing a specific number of containers, such as one, while retaining the other containers in the stack. The iris mechanism is adapted for preventing unauthorized removal of containers from the dispensing apparatus. The iris mechanism defines a central opening through which a released container must pass and has means for changing the size of the opening between a closed position wherein the opening is smaller than the largest diameter of a cup to be dispensed by the apparatus, and an open position wherein the opening is at least as large as the largest diameter of a cup to be dispensed.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
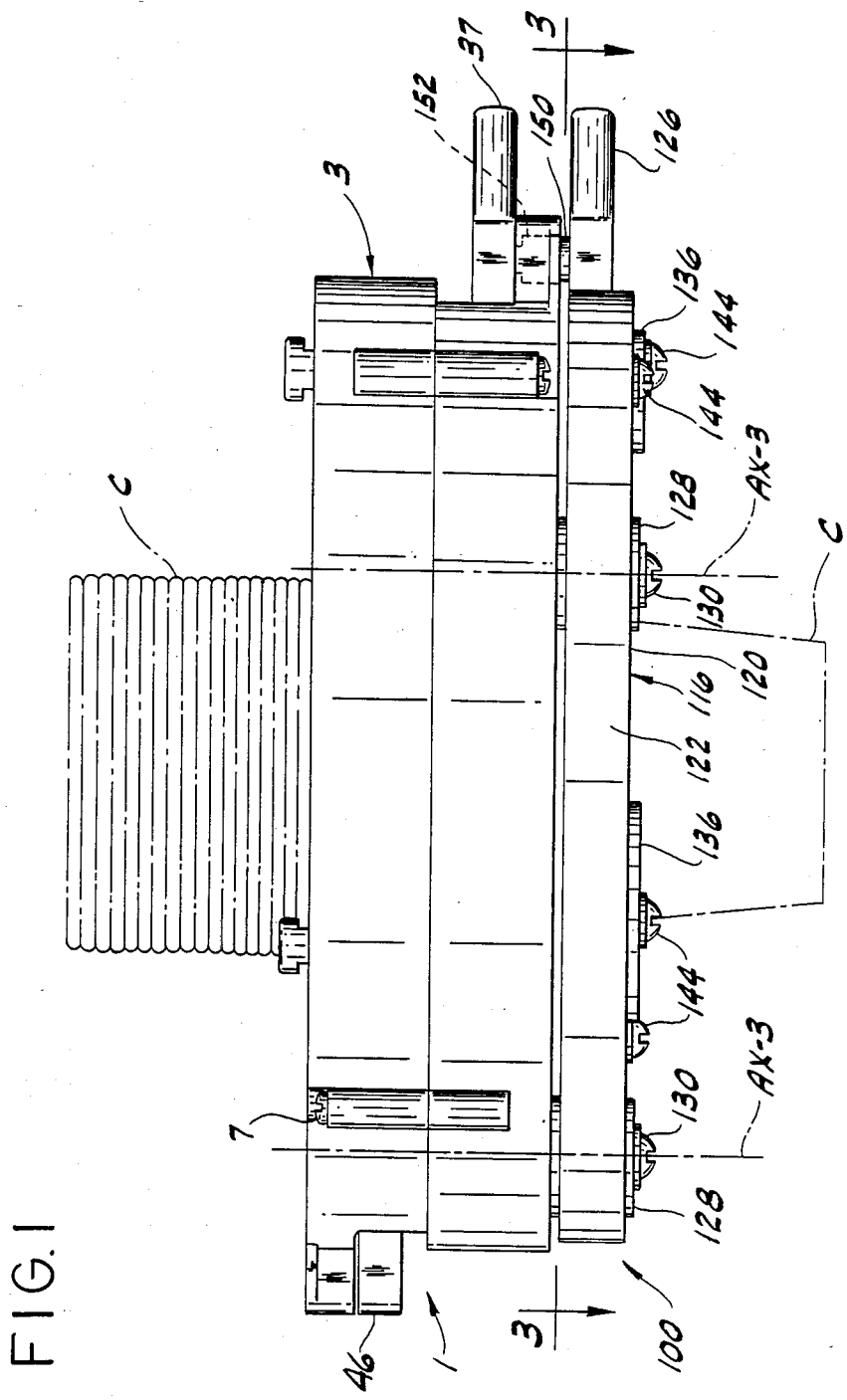
FIG. 1 is a side view of an iris mechanism of the present invention attached to the bottom of apparatus for dispensing a single container from a stack of containers.
Figure 2:
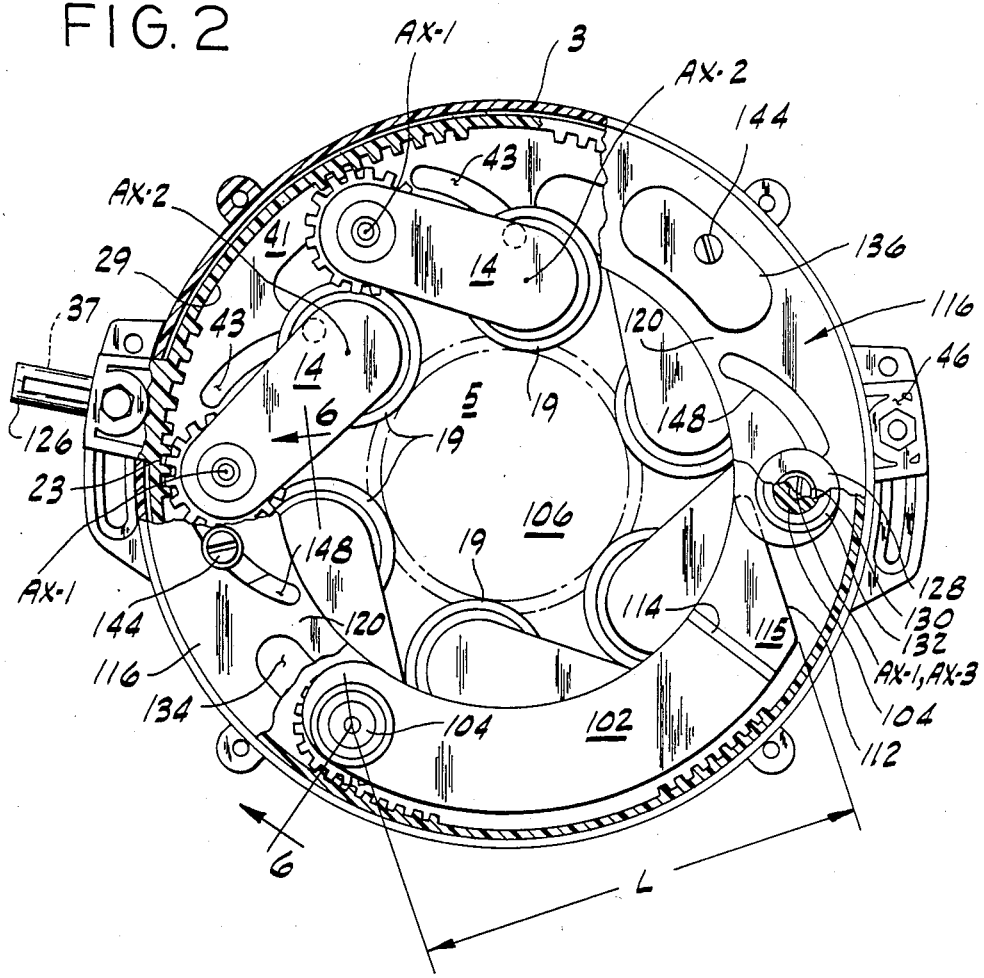
FIG. 2 is a bottom plan view of the iris mechanism and container dispensing apparatus of FIG. 1 with portions of the iris mechanism and apparatus broken away to illustrate details.

Referring now to the drawings, an iris mechanism of the present invention is designated in its entirety by the reference numeral 100. As shown in FIGS. 1 and 2, the iris mechanism 100 is especially adapted for preventing unauthorized removal of containers, such as paper cups C, from apparatus generally indicated at 1 for dispensing containers. The container-dispensing apparatus 1 may be of the type, for example, disclosed in co-assigned U.S. Pat. No. 4,426,017, issued Jan. 17, 1984 for "Apparatus for Dispensing Containers from a Stack of Nested Containers", which is incorporated herein by reference. The following discussion will be directed to an iris mechanism 100 used with this specific apparatus for purposes of illustration, it being understood that the iris mechanism may be used with many other types of container-dispensing apparatus.

The Container-dispensing apparatus 1 generally comprises a framework or casing generally designated 3 having a circular cup stack-accommodating opening 5 therethrough, the casing being adapted to be mounted inside a vendor, for example, with the central axis of the opening generally vertical. The apparatus 1 also includes a plurality of arms 14 (e.g., 6 arms) spaced at intervals around the opening 5, each arm being swingable in and out relative to the central axis of the opening on pivot axes AX-1 for adjustment to handle containers C of different diameters.

Each arm 14 mounts a cam or escapement member 19 in the opening 5 for rotation on a generally vertical axis AX-2 offset from the pivot axis AX-1. The escapement member 19 is rotatable on the arm between a first position wherein the escapement members support the stack and a second position for stripping the lowermost container from the next container above and releasing the lowermost container to drop while supporting the stack. The escapement members are rotated in unison by means of a ring gear 29 and a series of gears 23, 25 and 27 in the arms, the ring gear being rotatably mounted inside the casing 3 generally on the central axis of the opening 5 to drive the arm gears. The ring gear 29 may be rotated manually first in one direction and then in the other by means of a lever 37 projecting from the ring gear through a slot in the side wall 13 of the casing 3.

As illustrated in the drawings, the iris mechanism 100 may be mounted directly on the bottom wall 11 of the container-dispensing apparatus 1, although it will be understood that the iris mechanism may be mounted to a separate framework so long as the iris mechanism is maintained in a suitable position relative to the container-dispensing apparatus. Preferably, a plurality of iris members (e.g., three generally flat, horizontal, crescent-shape blades 102) are pivotably mounted on bosses 104 projecting vertically downwardly from the bottom wall 11 of the containerdispensing apparatus 1 at 120 degree intervals around the stack-accommodating opening 5. The inside curved edges of the blades 102 define the perimeter of a central opening 106 through which a released container C must pass.

Figure 6:
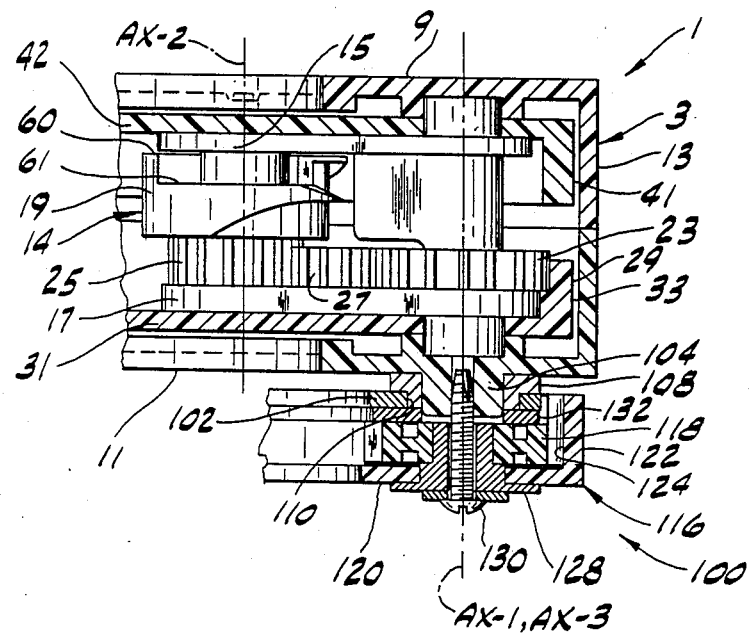
FIG. 6 is a cross-sectional view along line 6—6 of FIG. 2.

A plurality of stepped metal sleeves or bushings 108 (FIG. 6), constituting boss sleeves, are provided to protect the bosses 104 and blades 102 from friction and wear caused by rotation of the blades relative to the bosses. Each boss sleeve 108 has larger and smaller outside diameter portions separated by an external shoulder, and a central bore sized to accommodate the respective boss 104. The vertical dimension of each of the larger and smaller diameter portions of the boss sleeves 108 is preferably at least as great or slightly greater than the vertical dimension (i.e., thickness) of the blades 102.

A circular opening 110 is provided in each blade 102 adjacent one end of the blade, the opening having an internal diameter slightly larger than the diameter of the smaller diameter portion of a respective boss sleeve 108. Each blade 102 pivots on the smaller diameter portion of a respective boss sleeve 108 with the top surface of the blade slidably engaging the shoulder of the sleeve, the difference between the diameters of the two portions of the sleeves 108 being sufficiently great that the external shoulder has a surface area sufficient to prevent the blades 102 from moving vertically upwardly to the bottom wall 11 of the casing 3.

Figure 3:
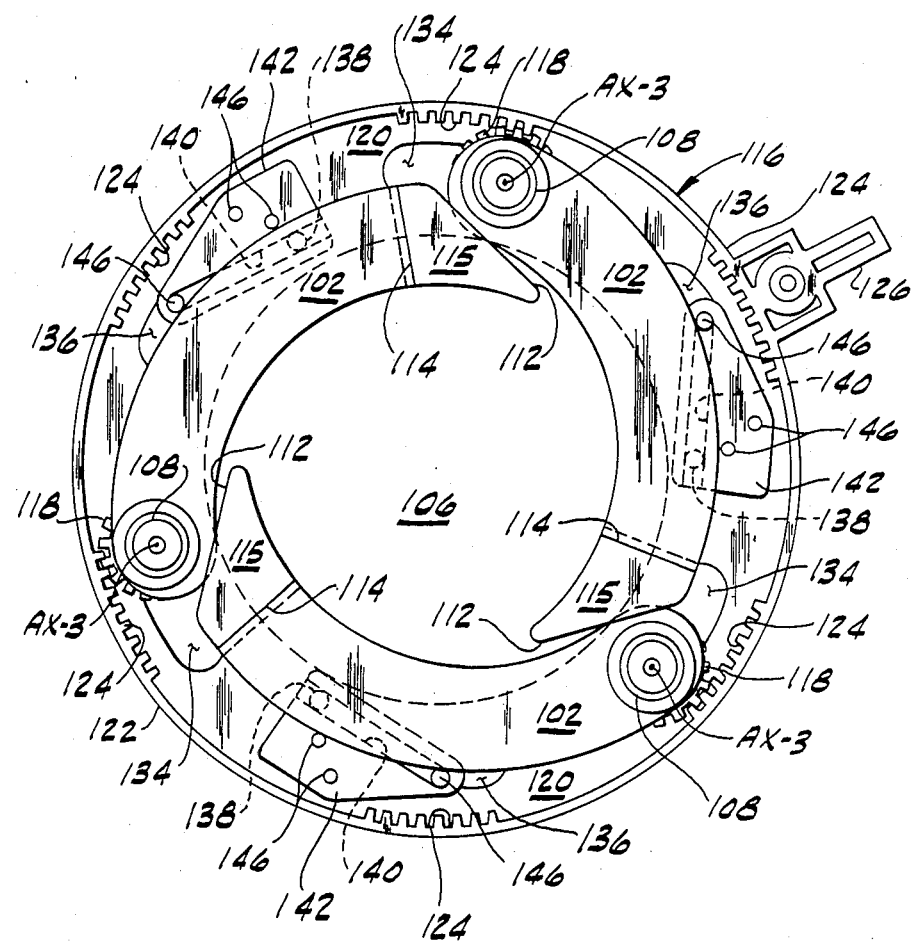
FIG. 3 is a cross-sectional view along line 3—3 of FIG. 1 showing the iris mechanism in its closed position.
Figure 4:
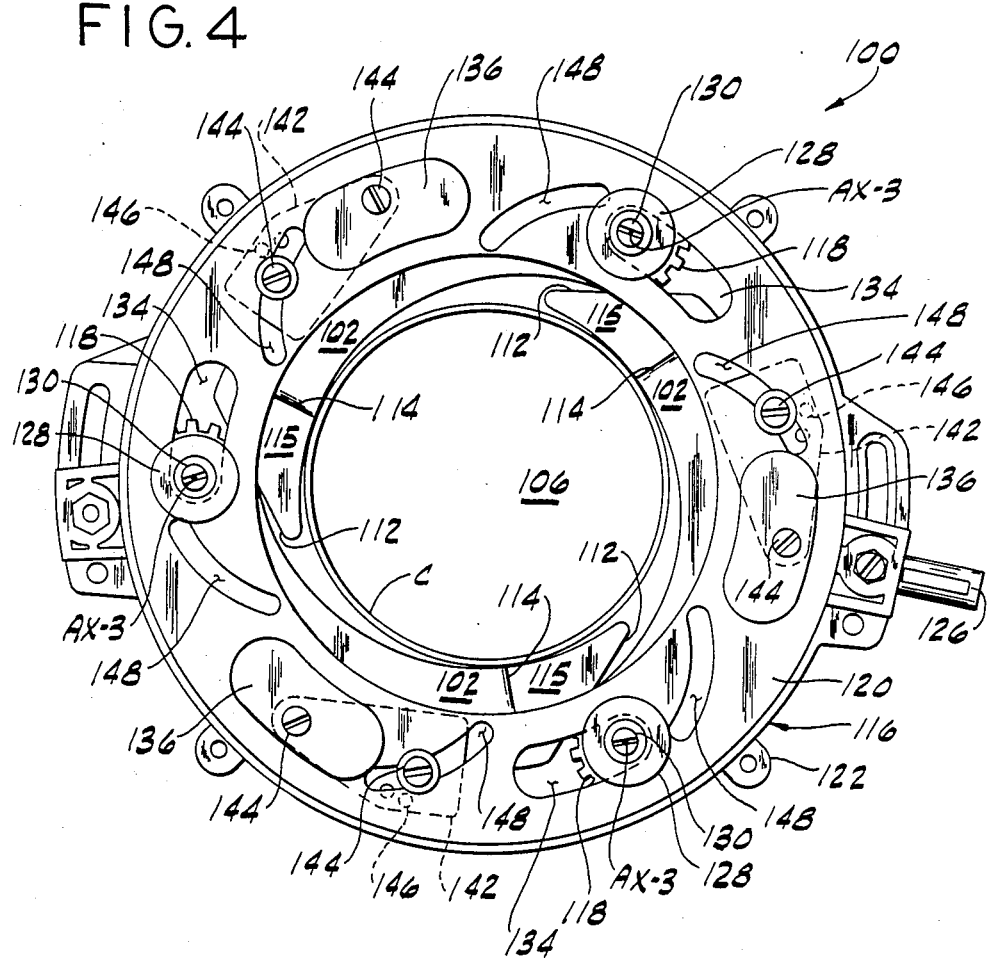
FIG. 4 is a bottom plan view of the iris mechanism of FIGS. 1-3 showing the iris mechanism in the closed postion of FIG. 3.
Figure 5:
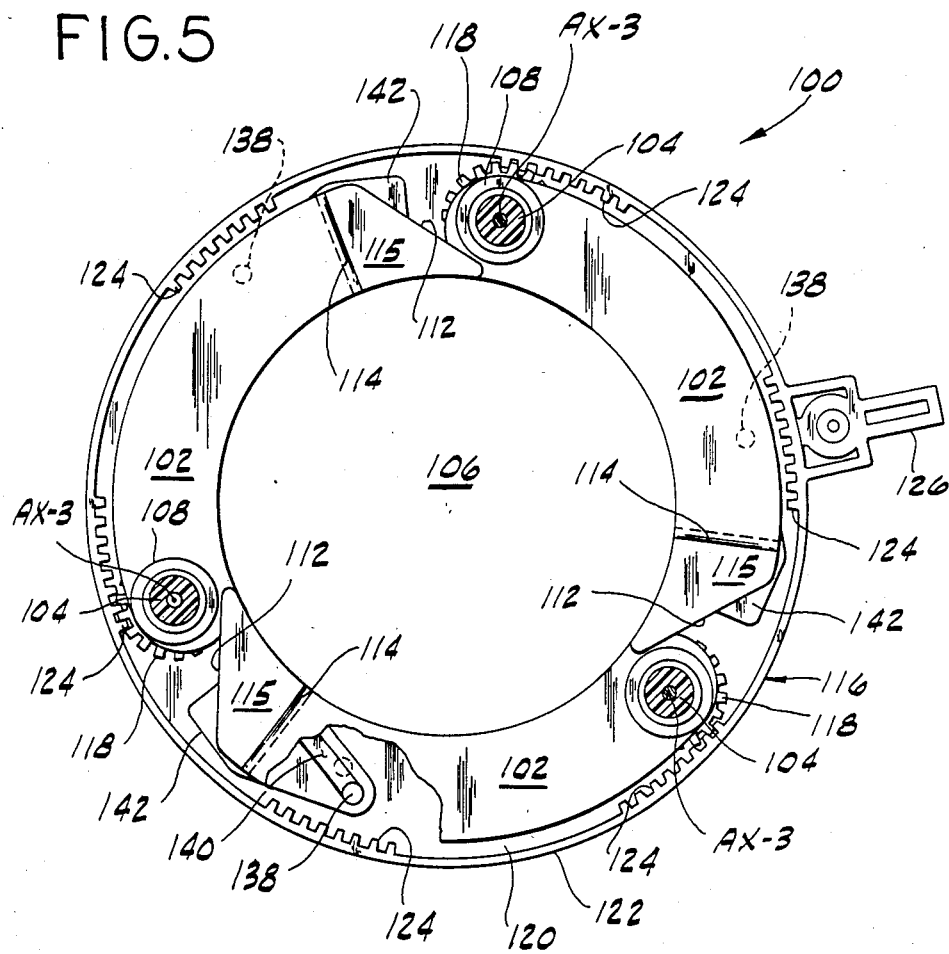
FIG. 5 is a cross-sectional view similar to FIG. 3 showing the is mechanism in its open position.

The other (free) end 112 of each blade 102 is pivotable with respect to a generally vertical pivot axis AX-3 co-axial with the respective bushing 108 and boss 104. Each pivot axis AX-3 is preferably coaxial with a respective pivot axis AX-1 of the container-dispensing apparatus, the arrangement being such that there is a pivot axis AX-3 coaxial with every other axis AX-1. It will be understood, however, that the pivot axes AX-3 may be offset with respect to the pivot axes AX-1. The free ends 112 of the blades are pivotable between a closed position (FIGS. 3 and 4) wherein the central opening 106 is smaller than the largest diameter of a cup C to be dispensed by the apparatus and an open position (FIG. 2 and 5) wherein the central opening is at least as large as the largest diameter of a cup to be dispensed.

Each blade 102 has a bend 114 generally adjacent the free end 112 of the blade forming a generally horizontal ⁁⁁5 offset upwardly from the blade a distance ⁁ tn the thickness of the blade. The free edge 112, which is preferably of generally flat or straight configuration, is formed along a chord of a circle or arc formed by the rotation of the free edge around its respective pivot axis AX-3. The length L (FIG. 2) of each blade 102 (between the free end 112 and the pivot axis AX-3 of the blade) is slightly less than the distance between the blade's pivot axis and the larger diameter portion of the respective adjacent sleeve 108, the arrangement being such that the free end of each blade is generally adjacent the larger diameter portion of the sleeve 108 of a respective adjacent blade throughout the motion of the blade between the open and closed positions. In addition, the free end 112 of each blade 102 overlaps and is slidable in a generally horizontal plane along an edge of a respective adjacent blade, the free end being held captive in the horizontal plane between the casing 3 of the container-dispensing apparatus 1 and the edge of the adjacent blade.

A ring member generally designated 116 is provided for simultaneously moving the blades 102 between the open and closed positions. More specifically, the ring member 116, which may be of construction identical to that of the ring gear 29 and adjustment ring 41 of the container-dispensing apparatus, is rotatable with respect to the blades 102 and the casing 3 on pinion gears 118 to move the blades between the open and closed positions. The ring member 116 preferably comprises a ring gear 116 having a flat annular portion 120 disposed in a generally horizontal plane immediately below the pinion gears 118, and a circular flange portion 122 extending vertically upwardly from the annular portion at the outer periphery thereof. The flange portion 122 surrounds the pinions 118 and is formed with a plurality of gear segments 124 spaced at intervals around its inner surface which intermesh with the pinions. The ring gear 116 may be rotated first in one direction and then in another by means of a lever 126 (similar to lever 37 of the container-dispensing apparatus) projecting radially outwardly from the flange portion 122 of the ring gear, the lever constituting means for rotating the ring member. The ring gear 116 is preferably molded from a suitable plastic, such as that sold under the trade designation "Celcon M90-04" by Celanese Plastic Co.

Each pinion gear 118 is rotatable on the pivot axis AX-3 of a respective blade 102, each pinion gear being rotatable, for example, on the smaller diameter portion of a stepped bushing 128, constituting a gear bushing, mounted on the respective boss 104. The larger diameter portion of each gear bushing 128 has a vertical dimension slightly greater than the thickness of the annular portion 120 of the ring gear. Each stepped bushing 128 has a generally vertical central bore for receiving a fastener or screw 130 to mount the bushing on a respective boss 104. The pinion gears 118 may be of construction and material substantially identical to that of the pinion gears 23 of the container-dispensing apparatus, the pinion gears of the iris mechanism and dispensing apparatus preferably having the same outer diameter and number of teeth so that equal rotation of the ring gear 29 and the ring member 116 will cause pinion gears 118 and 23 to rotate an equal amount. A metal washer 132 may be provided between each pinion gear 118 and the respective blade to reduce friction between the pinion gear, on the one hand, and the respective blade and boss 104, on the other.

The ring gear 116 has a plurality of elongate slots 134 (e.g., six slots) therein sized slidably to receive the larger diameter portions of the gear bushings 128, the slots being arranged on the flat annular portion 120 of the gear at equal intervals (e.g., six slots at 60 degree intervals or three slots at 120 degree intervals) circumferentially with respect to the vertical axis of the central opening 106. The slots 134 of the iris mechanism's gear 116 may be substantially identical to the slots 55 of the ring gear 29 of the container-dispensing apparatus 1. Preferably, at least three of the slots 134, spaced at 120 degrees with respect to each other, actually receive the large diameter portions of the gear bushings, the ring gear 116 being adapted to slide with respect to the bushings so that it may be rotated with respect to the bushings and blades 102. The ring gear 116 is supported on lower annular flanges extending radially outwardly from the gear bushing 128 adjacent the larger diameter portion thereof, the flanges being integrally formed with their respective gear bushings. Nylon filler plugs or plates 136 may be mounted in any slots 134 not receiving a gear bushing 128 therein to cover the slot.

Means is provided for simultaneously moving the blades 102 between the open and closed positions by rotating the ring member 116. For example, the means for simultaneously moving the blades 102 may comprise a slot-and-pin mechanism for moving the free ends 112 of the blades inwardly and outwardly with respect to the ring member 116.

More specifically, each blade 102 may include a metal pin 138 projecting vertically downwardly from the blade generally adjacent the radially outward edge of the blade (i.e., outward with respect to the iris mechanism 100). The pin 138 is preferably spaced from the pivot axis AX-3 a distance sufficiently great that a generally small force applied to the pin will readily move the blades inwardly or outwardly with respect to each other. Each pin 138 is received in a respective guide slot 140 formed in a guide portion or block 142 (e.g., of nylon) mounted on the flat annular portion 120 of the ring gear 116, the slots having longitudinal axes which are skewed with respect to the central opening 106 to guide the pivotal movement of the blade by moving the pins inwardly or outwardly with respect to the ring gear as the ring gear is rotated.

Means is preferably provided for adjusting the position of the guide slots 140 to vary the size of the central opening 106 defined by the blades 102 in their closed position according to the size container to be dispensed. For example, each guide block 142 may be mounted on the ring gear 116 by two screws 144 received through the ring gear and threaded into the guide block, and the adjusting means may include a plurality of threaded bores 146 in each guide block 142 so that the block may be pivoted between positions wherein different bores receive the screws. One of the two screws 144 mounting each guide block 142 may be used to clamp the ring gear 116 between a respective filler plate 136 and guide block, and the other screw may be positioned in a respective cam slot 148 substantially identical to the six cam slots 43 of the adjustment ring 41. It will be observed that the amount the guide slots 140 are "skewed" with respect to the central opening 106 and the size of the central opening 106 in its closed position is varied according to the size container to be dispensed by pivoting the guide blocks 142 and fastening the screws 144 in the appropriate bores 146 of the guide blocks.

The ring gear levers 126 and 37 of the iris mechanism 100 and container-dispensing apparatus 1 are preferably interconnected (e.g., by a generally cylindric link 150 bridging the gap between the two levers) so that the ring gears 116, 29 are simultaneously rotated by equal amounts whenever either ring gear is rotated. The link 150 is movable in a slot 152 formed in an external flange extending radially outwardly from the upper half of the casing 3 of the container-dispensing apparatus 1. The length of the slot 152 is sufficient to accommodate the movement of the levers 126, 37 necessary to rotate the ring gear 116 between the open and closed positions of the central opening. It will be observed that, since the gear ring levers 126, 37 are linked, the iris mechanism cooperates with the dispensing apparatus to open and close the central opening 106 of the iris mechanism according to whether a container C is being dispensed from the apparatus.

Alternatively, the ring gears 116 and 29 may be interconnected via the pinion gears 118 and 23 of the iris mechanism and the container-dispensing apparatus by, for example, mounting each pinion gear 118 on a common shaft with a respective pinion gear 23. In this case the pinion gear 118 constitutes a "drive gear" for driving the iris mechanism's ring gear in accordance with the movement of the escapement members 19 of the container-dispensing apparatus.

Figure 7:
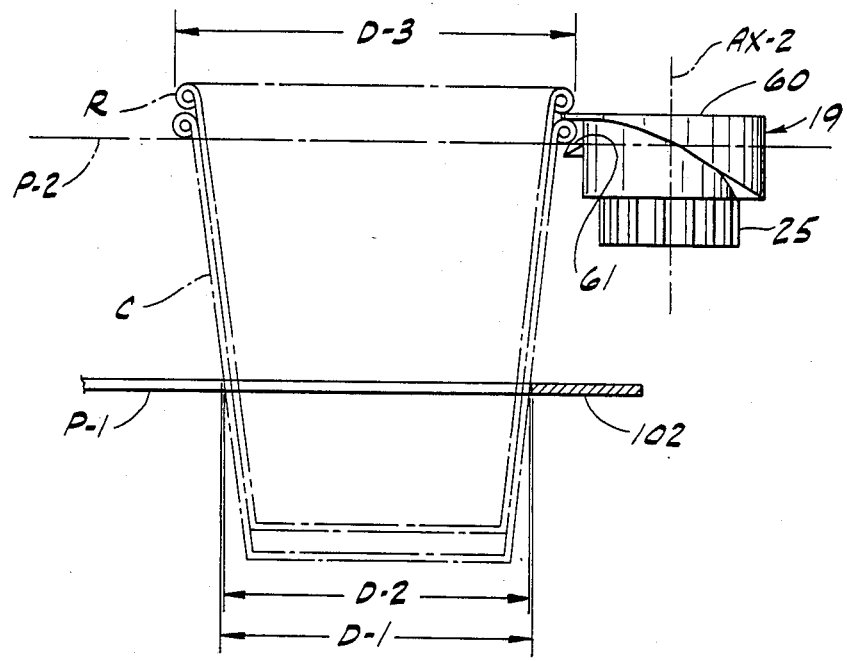
FIG. 7 is a schematic view of a portion of the iris mechanism and container-dispensing apparatus of Figs. 1-6.
Figure 8:
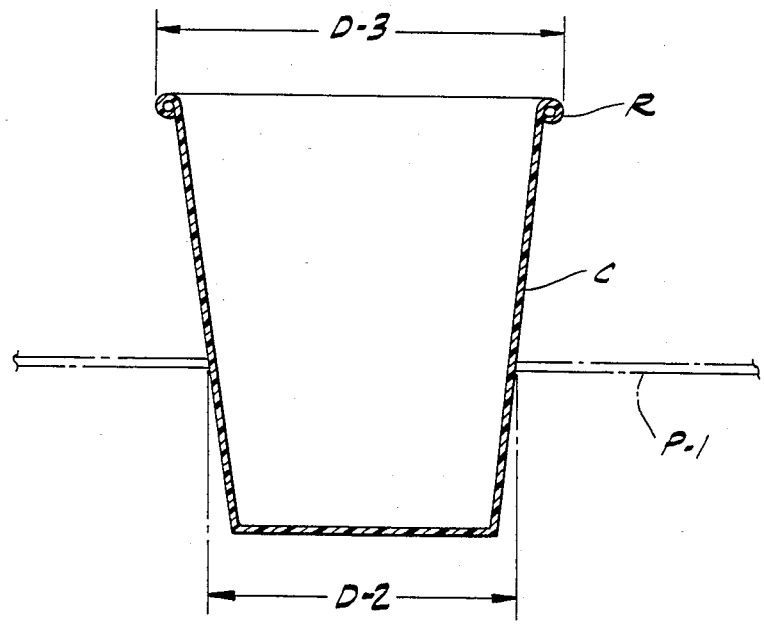
FIG. 8 is a schematic vertical cross-sectional view of a cup to be dispensed from dispensing apparatus through the iris mechanism of FIGS. 1-7.

The spacing between the horizontal plane P-1 of the iris blades 102 and the horizontal plane P-2 of the shoulders 61 of the escapement members 19 is such that a hand is prevented from getting a sufficient grip on the lowermost cup C to pull the cup down from the container-dispensing apparatus 1. For example, the iris blades 102 may be positioned in a horizontal plane P-1 (FIGS. 7 and 8) running through a lower or mid portion of the cup C or, alternatively, the iris blades may be spaced below the bottom of the cup so that the cups can not be reached by a hand. While a person may be able to reach the cup C with his/her fingers if the iris blades 102 are positioned sufficiently close to a lower or mid portion of the cup, the iris blades should prevent tipping or tilting the cup sufficiently to free the lip or rim R of the cup from the escapement members 19, thereby preventing unauthorized removal of the cups.

In addition, the cups C to be dispensed are preferably tapered downwardly from their upper rims R, and the iris blades 102 are movable to a closed position sufficiently close to the sides of the lowermost cup that the cup is prevented from being pulled downwardly through the central opening 106, even if the lip of the cup is pulled free of the escapement members 19. In other words, the diameter D-1 of the central opening 106 when the iris blades 102 are in their closed position is only slightly larger than the diameter D-2 of the cup adjacent the blades and yet smaller than the largest diameter D-3 of the cup so that the lowermost cup can not be pulled through the central opening. This arrangement also prevents the lowermost cup from being pulled downwardly off the escapement members 19.

While the iris blades 102 are shown in the drawings as being positioned relatively closely to the casing 3 of the container-dispensing apparatus 1, it will be understood that they could be spaced a more substantial distance and still function to prevent unauthorized removal of the cups C from the apparatus. It will be observed, however, that one advantage of spacing the iris blades 102 relatively closely to the casing 3 of the container-dispensing apparatus 1 is that the iris mechanism 100 and container-dispensing apparatus may be handled and installed as one generally compact unit.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An iris mechanism for preventing unauthorized removal of containers from apparatus for dispensing containers, such as cups, the apparatus including means for separating and releasing a single container from a stack of containers, the iris mechanism having a plurality of horizontally disposed blades with arcuate edges defining a central opening surrounded by the blades through which a released container must pass and having means for changing the size of the opening between a closed position wherein the opening is smaller than the largest diameter of a container to be dispensed by the apparatus and an open position wherein the opening is at least as large as the largest diameter of a container to be dispensed said blades forming a substantially encompassing horizontal wall about a lower portion of the container when in the closed position so as to block access to an upper portion of a container from below.

2. An iris mechanism as set forth in claim 1 wherein the means for changing the size of the opening comprises a plurality of the blades defining the perimeter of the opening, one end of each blade being adapted to be pivotably connected to a framework and the other end of each blade constituting the free end of the blade being pivotable between the open and closed positions.

3. An iris mechanism as set forth in claim 2 wherein the free end of each blade overlaps a respective adjacent blade and is slidable generally along an edge of the adjacent blade.

4. An iris mechanism as set forth in claim 2 including a ring member having means for simultaneously moving the blades between the open and closed positions when the ring member is rotated.

5. A iris mechanism as set forth in claim 4 wherein each blade includes a pin projecting from the blade, the means for simultaneously moving the blades including a plurality of portions of the ring member having slots therein, each slot receiving the pin of a respective blade for guiding the pivotal movement of the blade, the ring member being rotatable with respect to the blades to move the pins in the slots thereby simultaneously moving the free ends of the blades between the open and closed positions.

6. An iris mechanism as set forth in claim 5 wherein the end of the blade which is adapted to be connected to the framework is also adapted to be pivotably and slidably connected to the ring member.

7. An iris mechanism as set forth in claim 5 including:
    the ring member having a ring gear rotatable therewith;
    a plurality of pinion gears intermeshing with the ring gear, each pinion gear being rotatable on the pivot axis of a respective blade so that the ring gear may rotate with respect to the blades.

8. An iris mechanism as set forth in claim 5 wherein the ring member includes means for adjusting the position of the slots to vary the size of the opening in its closed position according to the size container to be dispensed.

9. An iris mechanism as set forth in claim 8 including means for rotating the ring member, the ring-rotating means being adapted to cooperate with the dispensing apparatus to open and close the opening according to whether a container is being dispensed.

10. In combination with apparatus for dispensing containers, such as cups, from a stack of nested containers, the apparatus comprising means for dispensing a specific number of containers, such as one, while retaining the other containers in the stack; an iris mechanism for preventing unauthorized removal of containers from the dispensing apparatus, the iris mechanism having a plurality of horizontally disposed blades with arcuate edges defining a central opening surrounded by the blades through which a released container must pass and having means for changing the size of the opening between a closed position wherein the opening is smaller than the largest diameter of a container to be dispensed by the apparatus and an open position wherein the opening is at least as large as the largest diameter of a container to be dispensed said blades forming a substantially encompassing horizontal wall about a lower portion of the container when in the closed position so as to block access to an upper portion of a container from below.

11. A combination as set forth in claim 10 wherein the dispensing apparatus is adapted to handle containers of different diameters within a range of diameters, the means for simultaneously moving the iris members being adjustable to vary the size of the opening in the closed position according to the size container to be dispensed.

12. A combination as set forth in claim 10 wherein the means for changing the size of the opening comprises a plurality of the blades defining the perimeter of the opening, one end of each blade being adapted to be pivotably connected to a framework and the other end of each blade constituting the free end of the blade being pivotable between the open and closed positions.

13. A combination as set forth in claim 12 wherein the free end of each blade overlaps a respective adjacent blade and is slidable generally along an edge of the adjacent blade.

14. A combination as set forth in claim 12 wherein the dispensing apparatus includes a framework for holding the means for dispensing a specific number of containers, the one end of each blade being pivotably connected to the framework.

15. A combination as set forth in claim 12 including a ring member having means for simultaneously moving the blades between the open and closed positions when the ring member is rotated.

16. A combination as set forth in claim 15 wherein each blade includes a pin projecting from the blade, the means for simultaneously moving the blades including a plurality of portions of the ring member having slots therein, each slot receiving the pin of a respective blade for guiding the pivotal movement of the blade, the ring member being rotatable with respect to the blades to move the pins in the slots thereby simultaneously moving the free ends of the blades between the open and closed positions.

17. A combination as set forth in claim 16 wherein the dispensing apparatus includes a framework for holding the means for dispensing a specific number of containers, the one end of the blade being pivotably connected to the framework and pivotably and slidably connected to the ring member.

18. A combination as set forth in claim 16 including:
the ring member having a ring gear rotatable therewith;
a plurality of pinion gears intermeshing with the ring gear, each pinion gear being rotatable on the pivot axis of a respective blade so that the ring gear may rotate with respect to the blades.

19. A combination as set forth in claim 16 wherein the dispensing apparatus is adapted to handle containers of different diameters within a range of diameters, the ring member including means for adjusting the position of the slots to vary the size of the opening in its closed position according to the size container to be dispensed.

20. A combination as set forth in claim 19 including means for rotating the ring member, the ring-rotating means cooperating with the dispensing apparatus to open and close the opening according to whether a container is being dispensed.

* * * * *